2,905,682
Patented Sept. 22, 1959

2,905,682
SURFACE-ACTIVE FORMALS

Peter L. de Benneville and Homer J. Sims, Philadelphia, Pa., assignors to Rohm & Haas Company, Philadelphia, Pa., a corporation of Delaware No Drawing. Application September 24, 1957
Serial No. 685,798

6 Claims. (Cl. 260—410.6)

The present invention concerns specific symmetrical surface-active formals. It is further concerned with specific surface-active formals that are stable under alkaline or neutral conditions but which may be altered by acidic condtions. This alteration may take the form of changing an oil-soluble, surface-active compound to one of no surface activity or a water-soluble, surface-active compound to one of no surface activity. This invention also concerns a method for the preparation of the specific surface-active acetals and formals.

A wide variety of non-ionic surface-active agents is known in the art; and usually these are stable in acid, basic, and neutral media. In many applications it is necessary or at least highly desirable to remove or change the surface activity of an agent at some critical point in the operation. For example, if an ordinary non-ionic, surface-active agent is used to remove oils and waxes from raw wool by emulsification, there is obtained an emulsion in water which is not easily broken, either for the recovery of the oils and waxes or purposes of disposal. Also, the effluent from commercial laundries using non-ionic detergents remains highly surface active, causing many troublesome problems of foaming and disposal. Further, when non-ionic, surface-active agents are used for the recovery of petroleum, there is obtained an emulsion which is not easily broken without the use of certain complex and expensive demulsifying agents. The present compounds can be used in all of the above situations by employing a step in which the objectionable emulsions are treated with dilute acids which, since there is an alteration in the surface-active properties of the present compounds, permits the ready and effective conclusion of the operations described heretofore. The subject compounds may also be used in the preparation of emulsion polymers which can well be coagulated, if desired, in fiber form by treatment with dilute acids. These compounds are easily prepared from only two readily available starting materials, a chloromethyl ester of a specific carboxylic acid and a polyethylene glycol. Aqueous 0.1% solutions of them display low surface tensions and good surface-active properties, along with unusually low foaming properties.

The acid-sensitive, non-ionic, surface-active symmetrical formals of this invention may be represented by the formula

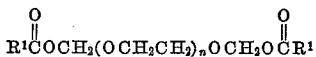

in which $R^1$ is an alkyl group of 8 to 21 carbon atoms, and $n$ is an integer of about 6 to 50. $R^1$ may exhibit any of the known spatial configurations such as normal, iso, or tertiary. $R^1$ may typically be octyl, nonyl, decyl, undecyl, dodecyl, tridecyl, pentadecyl, heptadecyl, octadecyl, nonadecyl or heneiscosyl.

The integer $n$ varies from 6 to about 50. When $n$ ranges from about 6 to 12, the product is substantially oil soluble; and when n ranges from 13 to about 50, the product is substantially water soluble.

The present compounds are preferably prepared by reacting a compound having the formula

with one having the formula

in a molecular ratio of substantially two of the former to one of the latter. The symbol X represents chlorine or bromine. The reaction is conducted in the presence of a strongly basic inorganic neutralizing agent. Among the basic agents that may be employed are the alkali metals, such as sodium and potassium; the alkali metal hydroxides, such as sodium hydroxide, potassium hydroxide, or lithium hydroxide; alkaline earth metal hydroxides, such as barium hydroxide, calcium hydroxide, and strontium hydroxide; alkali metal carbonates, such as sodium carbonate, potassium carbonate; and the like. The basic agent should be present in an amount somewhat greater than an equivalent amount of the halide reactant in order to assure the complete neutralization of the hydrochloric or hydrobromic acid formed in the reaction. It is possible to react one molecular equivalent of the glycol with a molecular equivalent of each of two different halogenated reactants, if desired, in order to obtain different $R^1$ groups on the hydrophobe ends of the molecule; but such usually leads to a mixture of products.

The compounds of this invention are prepared by conducting the reaction in the temperature range of about $-10°$ to $40°$ C., preferably $0°$ to $20°$ C. The reaction is exothermic in nature. It is preferred to mix the alcohol and the halogenated compound in a solvent and then add the basic agent gradually in small amounts. Suitable as a solvent in this respect are benzene, toluene, xylene, and the like. Reaction time is not critical but generally will vary from about thirty minutes to ten hours or more, depending largely on the individual reactants employed. While a solvent is not required in this reaction, one is desirable in order to minimize the effects of the exothermic nature of the reaction as previously indicated and also in order to aid in the separation of the inorganic salt by-product formed.

Typical reactions that may be employed include:

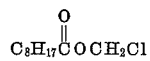

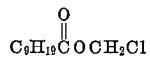

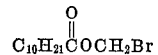

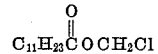

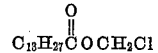

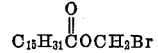

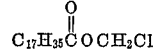

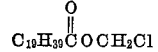

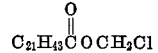

or any mixtures thereof,

HO(CH₂CH₂O)₆H
HO(CH₂CH₂O)₈H
HO(CH₂CH₂O)₉H
HO(CH₂CH₂O)₁₅H
HO(CH₂CH₂O)₂₀H
HO(CH₂CH₂O)₂₅H
HO(CH₂CH₂O)₃₀H
HO(CH₂CH₂O)₄₀H
HO(CH₂CH₂O)₄₅H
HO(CH₂CH₂O)₄₈H and

HO(CH₂CH₂O)₅₀H

The reactants of this invention are known compounds or readily prepared by known methods. In the preparation of the glycol reactants having 6 to 50 ethoxy units, there is frequently obtained a mixture of compounds having different numbers of ethoxy units. This is known in the art and is no deterrent to the present reaction since satisfactory and useful compounds are formed from the mixtures of compounds in the same way as the individual compounds. It is to be understood, therefore, that the integer $n$ stands for either the number of ethoxy units in a single compound or an average value in a mixture of compounds. Likewise the compounds $$R\overset{O}{\overset{\|}{C}}OCH_2X$$

are derived from fatty acids which are obtained frequently in commercial practice as mixtures. These mixtures lead to satisfactory and useful compounds.

At the conclusion of the reaction, the halide salt formed as a reaction by-product is removed by filtration. The product is obtained as the filtrate. If a solvent has been employed as indicated previously, it may be removed by stripping in a conventional manner. Even if a solvent has not been employed during the course of the reaction, the use of one is often advantageous in the isolation of the product in order to facilitate the removal of the inorganic halide salt formed.

The products of this invention, having the utilities previously stated, possess the hydrophobic-hydrophilic balance required for a substance to exhibit surface activity. As has been presented previously, it is frequently desirable to employ a surface-active material at one stage of a process and not have such material interfere at a later stage of the process as has been outlined heretofore. The present compounds may be used as valuable surface-active agents at one stage of a process and then chemically altered to lose surface-activity at a later stage of the process. The present compounds are quite stable in alkaline or neutral media but may be chemically altered in an acidic media, particularly at temperatures approaching about 100° C. Hydrochloric acid or the like is particularly convenient and effective for use in this respect; and the change is effected usually in a matter of minutes, such as 5 or 10, depending largely on the temperatures and compounds involved. The present compound is split into five fragments: two of which are formaldehyde; two are oily water-insoluble compounds, usually the same; and the fifth is a glycol. None of these fragments is surface active. Therefore, a compound is available that is surface-active during its period of use when surface-activity is demanded and which can be readily altered to yield compounds that are no longer surface active and that can be readily disposed of when such conditions are required.

The compounds of this invention, as well as the methods for their preparation, may be more fully understood from the following examples which are offered by way of illustration and not by way of limitation. Parts by weight are used throughout.

*Example 1*

There are introduced into a reaction vessel 46 parts of H(OCH₂CH₂)₁₀OH, 100 parts of benzene, and 50 parts of chloromethyl laurate. The mixture is cooled to 10° C. and eight parts of powdered potassium hydroxide is added in small portions over a period of two hours. The reaction mixture is held at 20° C., stirred at this temperature for two more hours, and then filtered. The benzene is removed from the filtrate under vacuum to yield 80 parts of the bis ester, $$C_{11}H_{23}\overset{O}{\overset{\|}{C}}OCH_2(OC_2H_4)_{10}OCH_2O\overset{O}{\overset{\|}{C}}C_{11}H_{23}$$

In a similar manner there are prepared $$C_8H_{17}\overset{O}{\overset{\|}{C}}OCH_2(OC_2H_4)_6OCH_2O\overset{O}{\overset{\|}{C}}C_8H_{17}$$

$$C_{17}H_{35}\overset{O}{\overset{\|}{C}}OCH_2(OC_2H_4)_{22}OCH_2O\overset{O}{\overset{\|}{C}}C_{17}H_{35}$$

$$C_{21}H_{43}\overset{O}{\overset{\|}{C}}OCH_2(OC_2H_4)_{50}OCH_2O\overset{O}{\overset{\|}{C}}C_{21}H_{43}$$

and $$C_{11}H_{23}\overset{O}{\overset{\|}{C}}OCH_2(OC_2H_4)_{33}OCH_2O\overset{O}{\overset{\|}{C}}C_{11}H_{23}$$

*Example 2*

There are introduced into a reaction vessel 150 parts of H(OCH₂CH₂)₃₃OH and 100 parts of toluene. To this there is added 62 parts of chloromethylpalmitate. The mixture is cooled to 0° C. and to it is added in small portions over a period of one hour five parts of powdered sodium hydroxide. The temperature is maintained at about 20° C. The reaction is allowed to come to room temperature, stirred for one hour and finally filtered. The solvent is removed under vacuum to yield 220 parts of a light yellow wax which is soluble in water. This is identified as the bis ester, $$C_{15}H_{31}\overset{O}{\overset{\|}{C}}OCH_2(OC_2H_4)_{33}OCH_2O\overset{O}{\overset{\|}{C}}C_{15}H_{31}$$

We claim:

1. A composition of matter having the formula $$R^1\overset{O}{\overset{\|}{C}}OCH_2(OCH_2CH_2)_nOCH_2O\overset{O}{\overset{\|}{C}}R^1$$

in which $R^1$ is an alkyl group of 8 to 21 carbon atoms and $n$ is an integer of about 6 to 50.

2. A composition of matter having the formula $$C_{11}H_{23}\overset{O}{\overset{\|}{C}}OCH_2(OC_2H_4)_{10}OCH_2O\overset{O}{\overset{\|}{C}}C_{11}H_{23}$$

3. A composition of matter having the formula $$C_8H_{17}\overset{O}{\overset{\|}{C}}OCH_2(OC_2H_4)_6OCH_2O\overset{O}{\overset{\|}{C}}C_8H_{17}$$

4. A composition of matter having the formula $$C_{17}H_{35}\overset{O}{\overset{\|}{C}}OCH_2(OC_2H_4)_{22}OCH_2O\overset{O}{\overset{\|}{C}}C_{17}H_{35}$$

5. A composition of matter having the formula $$C_{11}H_{23}\overset{O}{\overset{\|}{C}}OCH_2(OC_2H_4)_{33}OCH_2O\overset{O}{\overset{\|}{C}}C_{11}H_{23}$$

6. A composition of matter having the formula $$C_{15}H_{31}\overset{O}{\overset{\|}{C}}OCH_2(OC_2H_4)_{33}OCH_2O\overset{O}{\overset{\|}{C}}C_{15}H_{31}$$

References Cited in the file of this patent

UNITED STATES PATENTS

| | | |
|---|---|---|
| 2,395,265 | Gresham | Feb. 19, 1946 |
| 2,596,091 | De Benneville | May 13, 1952 |
| 2,796,423 | Cottle et al. | June 18, 1957 |

FOREIGN PATENTS

| | | |
|---|---|---|
| 888,688 | Germany | Sept. 3, 1953 |

OTHER REFERENCES

McCutcheon, Synthetic Detergents, 1950, pp. 156–157.